US010027985B2

United States Patent
Yamamoto (10) Patent No.: US 10,027,985 B2
(45) Date of Patent: Jul. 17, 2018

(54) IMAGE CODING DEVICE, IMAGE DECODING DEVICE, IMAGE CODING METHOD, AND IMAGE DECODING METHOD

(71) Applicant: SHARP KABUSHIKI KAISHA, Osaka-shi, Osaka (JP)

(72) Inventor: Yoshiya Yamamoto, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 171 days.

(21) Appl. No.: 14/385,885

(22) PCT Filed: Mar. 12, 2013

(86) PCT No.: PCT/JP2013/056761
§ 371 (c)(1),
(2) Date: Sep. 17, 2014

(87) PCT Pub. No.: WO2013/141075
PCT Pub. Date: Sep. 26, 2013

(65) Prior Publication Data
US 2015/0063468 A1    Mar. 5, 2015

(30) Foreign Application Priority Data

Mar. 22, 2012  (JP) ................................. 2012-065537

(51) Int. Cl.
*H04N 7/12* (2006.01)
*H04N 11/02* (2006.01)
(Continued)

(52) U.S. Cl.
CPC ........... *H04N 19/70* (2014.11); *H04N 19/132* (2014.11); *H04N 19/169* (2014.11); *H04N 19/20* (2014.11);
(Continued)

(58) Field of Classification Search
None
See application file for complete search history.

(56) References Cited

U.S. PATENT DOCUMENTS

2006/0008038 A1* 1/2006 Song ...................... H04N 19/63
375/350
2006/0114993 A1* 6/2006 Xiong .................. H04N 19/172
375/240.11
(Continued)

FOREIGN PATENT DOCUMENTS

JP   2008-271217 A   11/2008
JP   2009-207183 A    9/2009
(Continued)

OTHER PUBLICATIONS

ITU-T, "Advanced video coding for generic audiovisual services", Series H: Audiovisual and Multimedia Systems Infrastructure of audiovisual services—Coding of moving video, H.264, Mar. 2009, pp. 1-670.

*Primary Examiner* — Talha M Nawaz
(74) *Attorney, Agent, or Firm* — Birch, Stewart, Kolasch & Birch, LLP (57) ABSTRACT

An improvement in efficiency in an image decoding process is intended. An image coding device codes a texture image and a depth image. In the coding, the image coding device performs coding of the texture image by using depth information and coding of the texture image without using the depth information while following a coding control parameter. Further, the image coding device codes use result information that indicates whether or not the depth information is used in coding the texture image. An image decoding device decodes the texture image and the depth image. In the decoding, the image decoding device decodes the depth image in a case where decoded use result information indicates that the depth information is used and skips
(Continued)

a decoding process of the depth image in a case where the depth information is not used.

4 Claims, 6 Drawing Sheets

(51) Int. Cl.
| | | |
|---|---|---|
| H04N 11/04 | (2006.01) | |
| H04N 19/70 | (2014.01) | |
| H04N 19/597 | (2014.01) | |
| H04N 19/169 | (2014.01) | |
| H04N 19/132 | (2014.01) | |
| H04N 19/20 | (2014.01) | |
| H04N 19/46 | (2014.01) | |
| H04N 19/85 | (2014.01) | |

(52) U.S. Cl.
CPC .......... *H04N 19/46* (2014.11); *H04N 19/597* (2014.11); *H04N 19/85* (2014.11)

(56) References Cited

U.S. PATENT DOCUMENTS

| | | | |
|---|---|---|---|
| 2010/0050116 A1* | 2/2010 | Blick | G16H 10/40 715/808 |
| 2011/0044550 A1 | 2/2011 | Tian et al. | |
| 2011/0229048 A1* | 9/2011 | Ikeda | H03M 7/30 382/233 |
| 2011/0255796 A1 | 10/2011 | Nakamura et al. | |
| 2012/0020227 A1* | 1/2012 | Lin | H04L 41/5003 370/252 |
| 2012/0229602 A1* | 9/2012 | Chen | H04N 19/597 348/43 |
| 2012/0236934 A1* | 9/2012 | Chen | H04N 19/597 375/240.03 |
| 2013/0022113 A1* | 1/2013 | Chen | H04N 19/597 375/240.12 |
| 2013/0057646 A1* | 3/2013 | Chen | H04N 19/597 348/43 |
| 2013/0128965 A1* | 5/2013 | Zhang | H04N 19/00 375/240.12 |
| 2013/0169751 A1* | 7/2013 | Hattori | H04N 13/0048 348/43 |
| 2013/0194384 A1* | 8/2013 | Hannuksela | H04N 19/597 348/43 |
| 2013/0215027 A1* | 8/2013 | Van Lydegraf | G06F 3/017 345/158 |
| 2015/0042753 A1* | 2/2015 | Hattori | H04N 19/597 348/43 |

FOREIGN PATENT DOCUMENTS

| | | |
|---|---|---|
| JP | 2010-157825 | 7/2010 |
| JP | 2011-519226 | 6/2011 |

* cited by examiner

IMAGE CODING DEVICE, IMAGE DECODING DEVICE, IMAGE CODING METHOD, AND IMAGE DECODING METHOD

TECHNICAL FIELD

The present invention relates to an image coding device, an image decoding device, an image coding method, an image decoding method, and a program.

BACKGROUND ART

Moving picture experts group (MPEG)-2, MPEG-4, MPEG-4 advanced video coding (AVC)/H.264 are known as moving image coding methods (for example, see NPL 1).

In these moving image coding methods, motion-compensated inter predictive coding is performed. The motion-compensated inter predictive coding uses correlations in the moving image in a time direction to reduce a code amount. The motion-compensated inter predictive coding divides a coding target image into blocks, obtains a motion vector of each of the blocks, and uses a pixel value of the block of a reference image that is indicated by a motion vector for prediction, thereby realizing efficient coding.

Recently, in the H.264 standard, multiview video coding (MVC) that is an extended standard for coding a multiview moving image that is formed of a plurality of moving images in which a plurality of cameras capture images of the same captured object or background has been established as Annex H. This coding method uses disparity-compensated predictive coding that aims to reduce the code amount by using a disparity vector that represents a correlation between cameras.

In addition, in the present situation, a new standard in which a video that is captured by an imaging device is defined as a texture image and a depth image is transmitted together with the texture image has been established in MPEG-3DV that is an ad hoc group of the MPEG.

A depth image is information that indicates a distance from a camera to a captured object. The depth image may be generated by obtaining the distance from a device that is located in the vicinity of the imaging device and measures a distance, for example. Further, the depth image may be generated by analyzing images that are captured by imaging devices at a plurality of viewpoints.

In addition, the H.264/AVC and MVC specify that sequence information about an entire sequence such as a color format and a display order of pictures of a sequence that is coded is created and the sequence information may be coded. Specifically, such sequence information is coded as a sequence parameter set (SPS) that is a parameter set.

Having such a situation as a background, coding of a texture image by using information based on a depth image has been suggested. For example, a video coding device of PTL 1 generates a disparity-compensated image such that the base viewpoint image is converted into an image of a viewpoint of the texture image that is a coding target based on a positional relationship between the depth image that corresponds to the base viewpoint image and a camera when the texture image from a viewpoint other than the base viewpoint is coded. Further, the video coding device of PTL 1 generates a disparity difference image by using the difference between the texture image that is a coding target and the disparity-compensated image, that is, generates a texture image from a viewpoint other than the base viewpoint and codes the generated texture image.

CITATION LIST

Patent Literature

PTL 1: Japanese Unexamined Patent Application Publication No. 2009-207183

Non-Patent Literature

NPL 1: ITU-T Rec. H.264 (03/2009)—Advanced video coding for generic audiovisual services

DISCLOSURE OF THE INVENTION

Problems to be Solved by the Invention

For example, in standards such as the MPEG-3DV, whether or not coding of the texture image by using information of the depth image is to be performed may arbitrarily be selected depending on an application or the like, for example. This means that a texture image that is compressed by using the information of the depth image and a texture image that is not compressed by using the information of the depth image may be present in a mixed manner in a coded image, for example. In this case, a decoding device needs to use the depth image to decode the texture image that is compressed by using the information of the depth image but does not need to use the information of the depth image to decode the texture image that is not compressed by using the information of the depth image.

However, for example, in technologies that are disclosed by PTL 1 and NPL 1, the texture image that is coded by using the information of the depth image may not be distinguished from the texture image that is coded without using the information of the depth image before the decoding.

Thus, the decoding device has to execute a process of decoding the depth image even in a case where the information of the depth image may not be used because there is possibility that the information of the depth image will be used to decode the texture image. This result in regular execution of signal processing that is actually not necessary, thus reducing efficiency in a decoding process, for example.

The present invention has been made in consideration of such a situation, and an object thereof is to improve efficiency in an image decoding process.

Means for Solving the Problems (1) The present invention has been made for solving the above-described problem, and an image coding device as an embodiment of the present invention includes: a depth image coding section that codes a depth image that represents a distance from a viewpoint to an object that is contained in an object plane of a texture image and generates depth information based on the coded depth image; a texture image coding section that codes the texture image by using the depth information in a case where the texture image is to be coded by using the depth information and codes the texture image without using the depth information in a case where the texture image is to be coded without using the depth image; and a use result information coding section that generates use result information that indicates whether or not the depth information is used in coding the texture image and codes generated use result information.

(2) Further, the image coding device of the present invention further includes a sequence information coding process section that generates coded sequence information that contains the coded use result information in generating the coded sequence information by coding the sequence information that is associated with a sequence of the texture images.

(3) Further, in the image coding device of the present invention, the depth image coding section generates the depth information based on the depth images that correspond to the texture images in units of frames.

(4) Further, an image decoding device as an embodiment of the present invention includes: a texture image decoding section that decodes a coded texture image; a use result information decoding section that decodes coded use result information in which use result information that indicates whether or not depth information based on a depth image that represents a distance from a viewpoint to an object that is contained in an object plane of the texture image is used in coding the texture image is coded; and a depth image decoding section that decodes the coded depth image.

(5) Further, in the image decoding device of the present invention, the use result information decoding section decodes the coded use result information that is added to coded sequence information in which sequence information that is associated with a sequence of the texture images is coded.

(6) Further, an image coding method as an embodiment of the present invention includes: a depth image coding step of coding a depth image that represents a distance from a viewpoint to an object that is contained in an object plane of a texture image and generating depth information based on the coded depth image; a texture image coding step of coding the texture image by using the depth information in a case where the texture image is to be coded by using the depth information and coding the texture image without using the depth information in a case where the texture image is to be coded without using the depth information; and a use result information coding step of generating use result information that indicates whether or not the depth information is used in coding the texture image and coding generated use result information.

(7) Further, an image decoding method as an embodiment of the present invention includes: a texture image decoding step of decoding a coded texture image; a use result information decoding step of decoding coded use result information in which use result information that indicates whether or not depth information based on a depth image that represents a distance from a viewpoint to an object that is contained in an object plane of the texture image is used in coding the texture image is coded; and a depth image decoding step of executing a depth image decoding process that decodes the coded depth image in a case where the decoded use result information indicates that the depth information is used and skipping the depth image decoding process in a case where the decoded use result information indicates that the depth information is not used.

(8) Further, a program as an embodiment of the present invention allows a computer to execute: a depth image coding step of coding a depth image that represents a distance from a viewpoint to an object that is contained in an object plane of a texture image and generating depth information based on the coded depth image; a texture image coding step of coding the texture image by using the depth information in a case where the texture image is to be coded by using the depth information and coding the texture image without using the depth information in a case where the texture image is to be coded without using the depth information; and a use result information coding step of generating use result information that indicates whether or not the depth information is used in coding the texture image and coding generated use result information.

(9) Further, a program as an embodiment of the present invention allows a computer to execute: a texture image decoding step of decoding a coded texture image; a use result information decoding step of decoding coded use result information in which use result information that indicates whether or not depth information based on a depth image that represents a distance from a viewpoint to an object that is contained in an object plane of the texture image is used in coding the texture image is coded; and a depth image decoding step of executing a depth image decoding process that decodes the coded depth image in a case where the decoded use result information indicates that the depth information is used and skipping the depth image decoding process in a case where the decoded use result information indicates that the depth information is not used.

Effects of the Invention

The present invention may provide an effect of improving efficiency in an image decoding process.

BEST MODE FOR CARRYING OUT THE INVENTION

Figure 1:
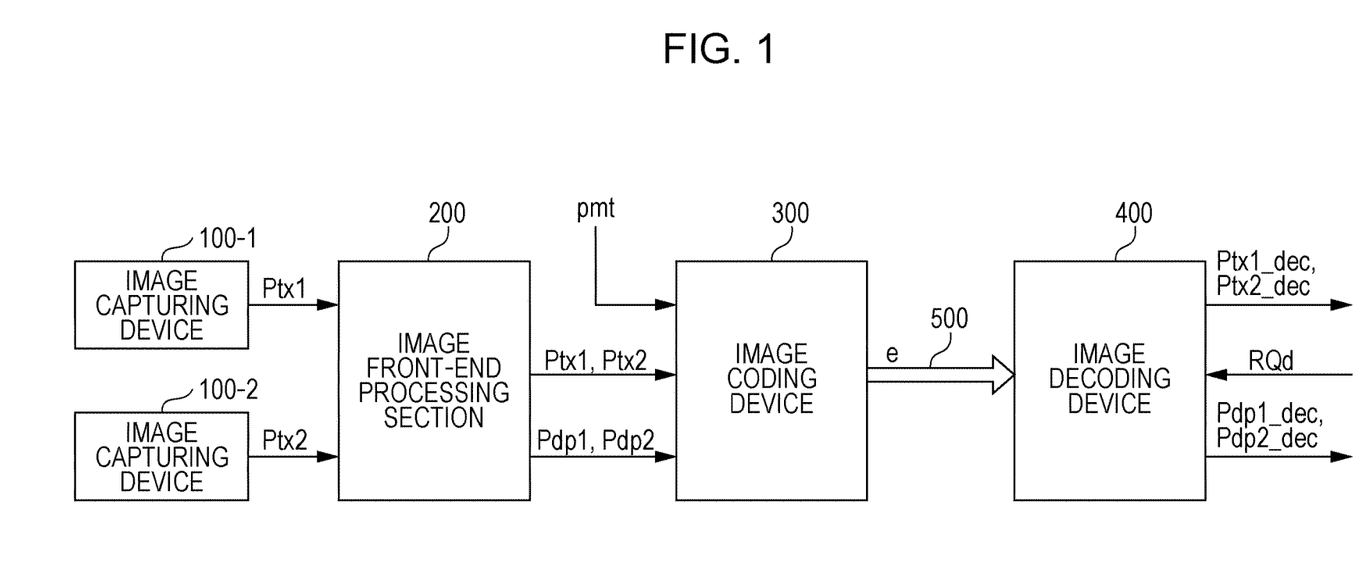
FIG. 1 illustrates a configuration example of an image processing system as an embodiment of the present invention.

FIG. 1 illustrates a configuration example of an image processing system that includes an image coding device and an image decoding device in an embodiment of the present invention.

The image processing system that is illustrated in this drawing includes imaging devices 100-1 and 100-2, an image front-end processing section 200, an image coding device 300, and an image decoding device 400.

The imaging devices 100-1 and 100-2 are located in different positions (viewpoints), capture images of a captured object that is included in the same field of view (object plane) at time intervals (for example, once every 1/30 second) that are determined in advance, and output image signals of contents of the captured images.

The image signals that are output by the imaging devices 100-1 and 100-2 are texture images (texture maps; two-dimensional images) Ptx1 and Ptx2, respectively. Each image signal serving as a texture image is a signal that has signal values (brightness values) that represent colors and tints of the captured object and a background that are included in the object plane for each pixel that is arranged in a two-dimensional plane. Further, each image signal serving as a texture image is an image signal that has a signal value that represents a color space of each pixel. An example of an image signal that has a signal value that represents such a color space is an RGB signal. An RGB signal contains an R signal that represents a brightness value of a red component, a G signal that represents a brightness value of a green component, and a B signal that represents a brightness value of a blue component.

The image front-end processing section 200 generates a depth image Pdp1 that corresponds to the texture image Ptx1 input from the imaging device 100-1. Further, the image front-end processing section 200 generates a depth image Pdp2 that corresponds to the texture image Ptx2 input from the imaging device 100-2. Thus, the image front-end processing section 200 first defines the texture image Ptx1 that is input from the imaging device 100-1 as a base image, for example. Then, the image front-end processing section 200 calculates a disparity between the base image and the texture image Ptx2 that is input from the other imaging device (the imaging device 100-2 in this example) for each of the pixels. The image front-end processing section 200 thereby generates the depth image Pdp1 that corresponds to the texture image Ptx1 that is captured by the imaging device 100-1.

The depth image (also referred to as "depth map" or "distance image") is an image signal in which a signal value (also referred to as "depth value", "depth", or the like) that represents a distance from a viewpoint (the imaging devices 100-1 and 100-2 in FIG. 1) to an object such as the captured object or the background that are included in the object plane is set as a signal value (pixel value) of each of the pixels arranged on the two-dimensional plane. The pixels that form the depth image correspond to pixels that form the base image. The depth image is information used to express a three-dimensional object plane by using the base image when projecting the object plane onto the two-dimensional plane.

Further, the texture images are generated in units of frames, for example. In response to this, the depth images are generated in units of frames, for example.

The image front-end processing section 200 next sets the texture image Ptx2 that is input from the other imaging device (the imaging device 100-2 in this case) as the base image. Then, the image front-end processing section 200 generates the depth image Pdp2 that corresponds to the texture image Ptx2 of the imaging device 100-2 in a process similar to generation of the depth image Pdp1 that corresponds to the texture image captured by the imaging device 100-1.

Then, the image front-end processing section 200 alternately outputs the texture image Ptx1 that is captured by the imaging device 100-1 and the texture image Ptx2 that is captured by the imaging device 100-2 for each of the frames. At the same time, the image front-end processing section 200 alternately outputs the depth image Pdp1 that corresponds to the texture image Ptx1 captured by the imaging device 100-1 and the depth image Pdp2 that corresponds to the texture image Ptx2 captured by the imaging device 100-2 for each of the frames.

It should be noted that the texture images Ptx1 and Ptx2 will be denoted as texture image Ptx in a case where it is not necessary to distinctively mention the texture image Ptx1 or Ptx2. Further, the depth images Pdp1 and Pdp2 will be denoted as depth image Pdp in a case where it is not necessary to distinctively mention the depth image Pdp 1 or Pdp2.

The texture images Ptx1 and Ptx2 and the depth images Pdp1 and Pdp2 that are output from the image front-end processing section 200 as described above are input to the image coding device 300. Further, a coding control parameter pmt is input to the image coding device 300.

The texture images Ptx1 and Ptx2 are images captured by the imaging devices 100-1 and 100-2, for example. That is, the texture images Ptx are input to the image coding device 300 as images that correspond to a plurality of viewpoints. Further, only the depth image Pdp that corresponds to a portion of the texture images Ptx may be input, and the depth images Pdp that corresponds to all the texture images Ptx may be input. Further, the texture image Ptx and the depth image Pdp may correspond to a moving image or a still image.

The image coding device 300 uses the input coding control parameter pmt to code (compress) each of the texture images Ptx1 and Ptx2 and the depth images Pdp1 and Pdp2.

Further, the image coding device 300 uses the input coding control parameter pmt to generate sequence information. The sequence information is information about sequences of the images (the texture images and the depth images) and includes kinds of information such as an image size, an aspect ratio, a frame rate, a bit rate, a color format, and a display order of pictures.

The image coding device 300 also codes (compresses) the sequence information. Then, the image coding device 300 codes the sequence information in a form of a sequence parameter set (SPS), for example.

Next, the image coding device 300 generates a bit stream e in which the coded texture images, the coded depth images, and the generated sequence information are multiplexed and outputs the bit stream e to the image decoding device 400 via a channel 500.

The bit stream e that is transmitted via the channel 500 is input to the image decoding device 400, and the image decoding device 400 demultiplexes the coded texture images, the coded depth images, and the sequence information from the bit stream e.

Then, the image decoding device 400 uses the sequence information to decode the demultiplexed coded texture images and generates texture images Ptx1_dec and Ptx2_dec. The texture images Ptx1_dec and Ptx2_dec correspond to the texture images Ptx1 and Ptx2 that are yet to be coded, respectively.

Further, the image decoding device 400 uses the sequence information to decode the demultiplexed coded depth images and generates depth images Pdp1_dec and Pdp2_dec. The image decoding device 400 outputs the texture images Ptx1_dec and Ptx2_dec and the depth images Pdp1_dec and Pdp2_dec that are generated as described above to the outside.

Further, a depth image request signal RQd is input to the image decoding device 400. The depth image request signal RQd is a signal that indicates whether or not a device or an application that uses a signal decoded by the image decoding device 400 requests the depth image and is output in response to control by a user, for example. An operation of the image decoding device 400 in response to the depth image request signal RQd will be described later.

The texture images Ptx1_dec and Ptx2_dec and the depth images Pdp1_dec and Pdp2_dec that are output from the image decoding device 400 are input to and reproduced by a reproduction device or a reproduction circuit that are not illustrated, and a multiview image is thereby displayed.

FIG. 1 illustrates an example where the image processing system includes the two imaging devices 100-1 and 100-2. However, an embodiment is not limited to this, and three or more imaging devices may be included. Further, the texture images Ptx and the depth images Pdp that are input by the image coding device 300 may not be based on images that are captured by the imaging devices 100-1 and 100-2 and may be images that are generated in advance by computer graphics or the like, for example.

Further, the channel 500 may be a cable or the like that transmits a video signal or a network, for example. Further, the image decoding device 400 may be an independent device that is not connected by the channel 500 and may generate the texture images Ptx and the depth images Pdp from a recording medium that stores data that correspond to the bit stream e, for example.

Figure 2:
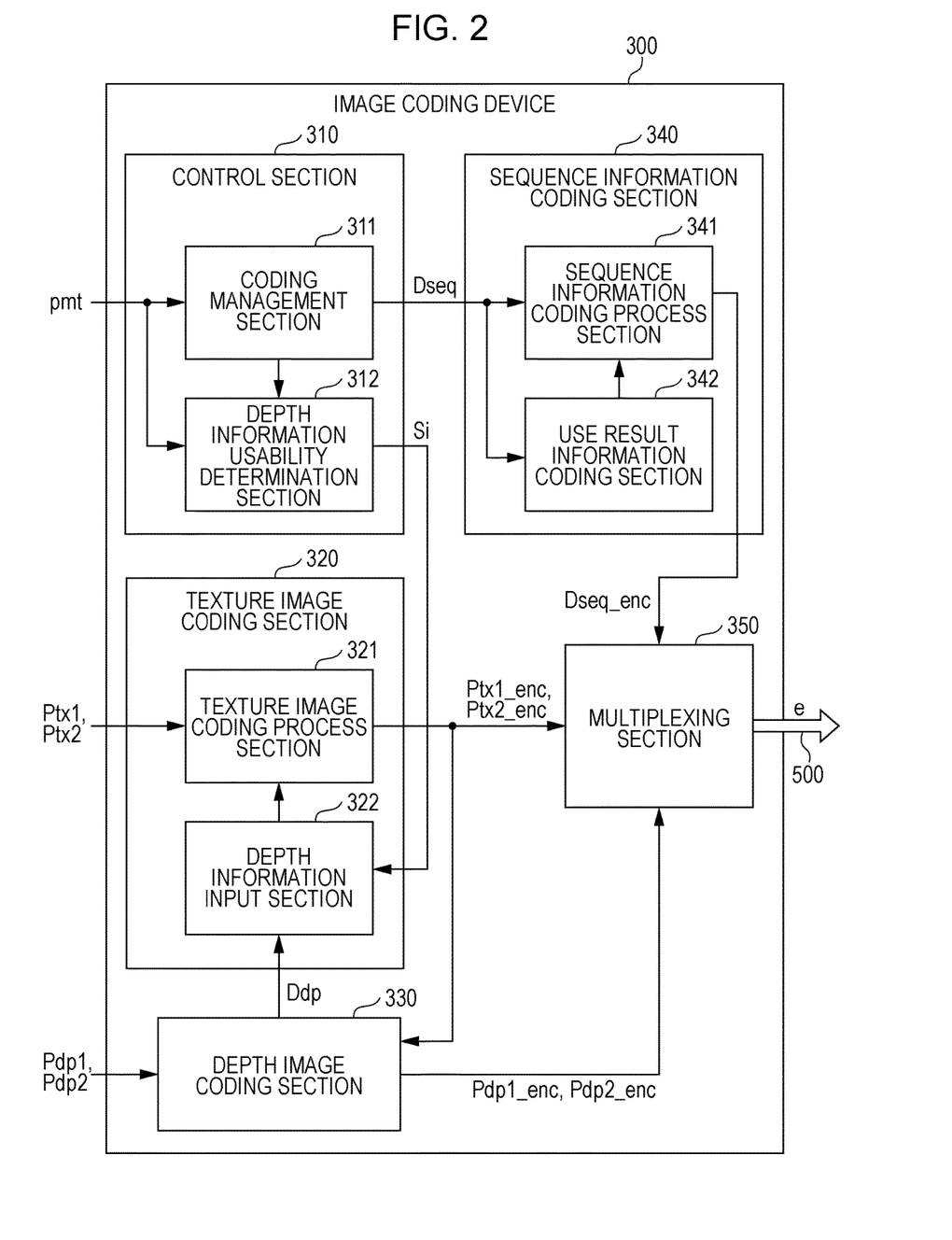
FIG. 2 illustrates a configuration example of an image coding device in this embodiment.

FIG. 2 illustrates a configuration example of the image coding device 300. The image coding device 300 includes a control section 310, a texture image coding section 320, a depth image coding section 330, a sequence information coding section 340, and a multiplexing section 350.

The control section 310 executes management related to coding. As illustrated in the drawing, the control section 310 includes a coding management section 311 and a depth information usability determination section 312, for example.

The coding control parameter pmt is input to the coding management section 311. The coding management section 311 uses the input coding control parameter pmt to generate sequence information Dseq and generates header information (network abstraction layer (NAL) unit header) or the like that are associated with the texture images and the depth images. The sequence information Dseq is input to the sequence information coding section 340.

The depth information usability determination section 312 determines whether or not the texture image Ptx should be coded by using depth information Ddp that is information based on the depth image Pdp corresponding to the texture image Ptx. Thus, the coding control parameter pmt is input to the depth information usability determination section 312. The coding control parameter pmt includes depth information use instruction information that instructs whether or not the depth information Ddp should be used when the texture image Ptx is coded.

The texture image coding section 320 may code the texture image by using the depth information Ddp that is information generated when the depth image coding section 330 codes the depth image Pdp, for example. For example, the texture image Ptx is coded by using the depth information Ddp, and coding efficiency may thereby be increased compared to a case where the depth image Ddp is not used.

However, when the depth information use instruction information that is contained in the coding control parameter pmt instructs that coding by using the depth information should not be executed, it is necessary to code the texture image Ptx without using the depth information.

Accordingly, the depth information usability determination section 312 refers to the depth information use instruction information in the coding control parameter pmt and thereby determines whether or not the information about the depth image Pdp (the depth information Ddp) should be used when the texture image Ptx is coded. Then, in accordance with the determination result, the depth information usability determination section 312 instructs the texture image coding section 320 on whether or not the depth information Ddp should be used. Then, the depth information usability determination section 312 outputs an instruction signal Si for instructing whether or not the depth information Ddp should be used to the texture image coding section 320.

The texture images Ptx1 and Ptx2 are input to the texture image coding section 320, and the texture image coding section 320 generates coded texture images Ptx1_enc and Ptx2_enc by coding the input texture images Ptx1 and Ptx2. It should be noted that the coded texture images Ptx1_enc and Ptx2_enc will hereinafter be denoted as coded texture image Ptx_enc in a case where the coded texture image Ptx1_enc and Ptx2_enc are not particularly distinguished.

Accordingly, the texture image coding section 320 may code the texture image Ptx by using the depth information Ddp that is input from the depth image coding section 330 when the texture image Ptx is coded. However, when the control section 310 determines that the coding by using the depth information Ddp should not be executed, the texture image Ptx is coded without using the depth information Ddp.

Thus, the texture image coding section 320 includes a texture image coding process section 321 and a depth information input section 322, for example.

The texture images Ptx1 and Ptx2 are input to the texture image coding process section 321, and the texture image coding process section 321 generates the coded texture images Ptx1_enc and Ptx2_enc by executing a coding process. Then, when the depth information Ddp is output from the depth information input section 322, the texture images Ptx1 and Ptx2 are coded by using the depth information Ddp that is output by the depth information input section 322. On the other hand, when the depth information Ddp is not output from the depth information input section 322, the texture images Ptx1 and Ptx2 are coded without using the depth information Ddp.

The depth information Ddp is input from the depth image coding section 330 and the instruction signal Si is input from the control section 310 to the depth information input section 322. When the instruction signal Si instructs that the depth information Ddp should be used, the depth information input section 322 outputs the depth information Ddp that is input from the depth image coding section 330 to the texture image coding process section 321. Accordingly, the texture image coding process section 321 codes the texture images Ptx by using the depth information Ddp.

On the other hand, when the instruction signal Si instructs that the depth information Ddp should not be used, the depth information input section 322 does not output the depth information Ddp that is input from the depth image coding section 330 to the texture image coding process section 321. Accordingly, the texture image coding process section 321 codes the texture images Ptx without using the depth information Ddp.

Such a configuration enables the texture image coding section 320 to switch coding operations between the coding of the texture images Ptx by using the depth information and the coding of the texture image Ptx without using the depth information.

A coding method of the texture image Ptx in the texture image coding process section 321 is not particularly limited. However, for example, MPEG-2 may be adopted. Further, a method may be adopted that is compliant to high efficiency video coding (HEVC) that is a next generation video coding standard whose standardization has been proceeding in the Joint Video Team (JVT) that is cooperatively established by "VCEG" of ITU-T and "MPEG" of ISO/IEC.

The depth images Pdp1 and Pdp2 are input to the depth image coding section 330, and the depth image coding section 330 generates coded depth images Pdp1_enc and Pdp2_enc by performing a coding process on the input depth images Pdp1 and Pdp2. It should be noted that the coded depth images Pdp1_enc and Pdp2_enc will hereinafter be denoted as coded depth image Pdp_enc in a case where the coded depth image Pdp1_enc and Pdp2_enc are not particularly distinguished.

Further, the depth image coding section 330 generates depth information Ddp that has prescribed information about the depth image Pdp on which the coding process is performed and outputs the depth information Ddp to the texture image coding section 320.

Further, the depth image coding section 330 generates the depth information Ddp based on the depth images Pdp that corresponds to the texture images Ptx in units of frames.

As an example, the depth image coding section 330 generates the depth information Ddp as follows: That is, the depth image coding section 330 performs reverse processing, that is, decoding on the coded depth images Pdp_enc in units of frames to generate decoded depth images. The decoded depth image is the same data as the depth image Pdp that is decoded in the image decoding device 400. As described above, the image coding device 300 and the image decoding device 400 share the same depth image, and generated predictive vectors may thereby be mutually matched.

Then, the depth image coding section 330 outputs pixel values of the decoded depth images as depth information Ddp, for example.

Further, the depth information Ddp may include a portion or all kinds of information such as a coding mode or a division method of each block (for example, 16×16, 8×8, or the like) in coding the depth images, a motion vector, a disparity vector, an index that specifies a reference image, and so forth.

A method that is compliant to the H.264/AVC or the HEVC, for example, may be adopted as a coding method of the depth image that corresponds to the depth image coding section 330. Further, when the depth images Pdp that correspond to each viewpoint of the texture images Ptx are input to the depth image coding section 330, coding may be performed by using a coding method that corresponds to the decoding method in the H.264/MVC.

The sequence information Dseq is input to the sequence information coding section 340, and the sequence information coding section 340 codes the input sequence information Dseq to generate coded sequence information Dseq_enc.

Here, when the coded texture image Ptx_enc is coded by using the depth information Ddp, the depth information Ddp is needed in decoding of that. On the other hand, when the coded texture image Ptx_enc is coded without using the depth information Ddp, the depth information Ddp is not needed in decoding of that.

Then, the sequence information coding section 340 generates use result information (independent_flag) that indicates whether or not the texture image Ptx is coded by using the corresponding depth information Ddp with respect to each of the texture images Ptx in accordance with results of the coding process of the texture images Ptx. The use result information is used as information that indicates whether or not the coded depth image Pdp_enc should be decoded for generation of the coded texture image Ptx_enc on the decoding side.

The sequence information coding section 340 generates the coded sequence information Dseq_enc such that the generated use result information is contained.

Thus, the sequence information coding section 340 includes a sequence information coding process section 341 and a use result information coding section 342.

The sequence information Dseq is input to the sequence information coding process section 341, and the sequence information coding process section 341 executes the coding process to generate the coded sequence information Dseq_enc. Further, the sequence information coding process section 341 generates the coded sequence information Dseq_enc by adding coded use result information in response to input of the coded use result information from the use result information coding section 342.

The use result information coding section 342 codes the use result information.

Thus, the sequence information Dseq is input to the use result information coding section 342, and the use result information coding section 342 refers to the depth information use instruction information that is contained in the sequence information Dseq. The use result information coding section 342 generates the use result information that indicates that the depth information Ddp is used in coding the texture images Ptx in a case where the depth information use instruction information provides instruction on the coding by using the depth information Ddp. On the other hand, the use result information coding section 342 generates the use result information that indicates that the depth information Ddp is not used in coding the texture images Ptx in a case where the depth information use instruction information does not provide instruction on the coding by using the depth information Ddp.

In addition, the use result information coding section 342 codes the use result information that is generated as described above.

The coded texture images Ptx1_enc and Ptx2_enc that are generated by the texture image coding section 320, the coded depth images Pdp1_enc and Pdp2_enc that are generated by the depth image coding section 330, and the coded sequence information Dseq_enc that is generated by the sequence information coding section 340 are input to the multiplexing section 350.

Then, the multiplexing section 350 multiplexes the input coded texture images Ptx1_enc and Ptx2_enc, coded depth images Pdp1_enc and Pdp2_enc, and coded sequence information Dseq_enc by time division, for example, and outputs those to the channel 500 as the bit stream e.

As described above, the image coding device 300 may output the sequence information while adding the use result information that indicates whether or not the corresponding depth information Ddp is used when the texture images Ptx are coded with respect to the texture images and the depth images that are compressed and coded to the sequence information.

The coded sequence information Dseq_enc, the coded texture images Ptx1_enc and Ptx2_enc, and the coded depth images Pdp1_enc and Pdp2_enc that are contained in the bit stream e are NAL units, for example.

A NAL unit is specified by the MPEG-4 AVC/H.264, for example.

The MPEG AVC/H.264 specifies that the syntax of the bit stream should have a two-layer structure of a video coding layer (VCL) and a network abstraction layer (NAL).

When the NAL is specified as described above, an image content is coded while being divided into plural kinds of NAL units. Formation of such a NAL structure may enable applications to various purposes such as storage of coded data in a file format such as MP4 and transmission by dividing coded data into packets in Real-time_Transport_ Protocol (RTP), for example.

In this embodiment, kinds of NAL units that are the coded sequence information Dseq_enc, the coded texture images Ptx1_enc and Ptx2_enc, and the coded depth images Pdp1_enc and Pdp2_enc are generated as a portion of the plural kinds of the NAL units.

Those NAL units contain unit identifiers (nal_unit_type).

Which kinds among the sequence information, the texture image, and the depth image by the unit identifiers the NAL units of the coded sequence information Dseq_enc, the coded texture images Ptx1_enc and Ptx2_enc, and the coded depth images Pdp1_enc and Pdp2_enc are may be identified.

Further, the NAL units are categorized into VCL-NAL units and non-VCL NAL units. The NAL unit of the coded texture images Ptx1_enc and Ptx2_enc that correspond to actual data of the content is a VCL-NAL unit. Further, the NAL unit of the coded depth images Pdp1_enc and Pdp2_enc is a VCL-NAL unit. On the other hand, the NAL unit of the coded sequence information Dseq_enc that is generated as the SPS is a non-VCL-NAL unit, for example.

Figure 3:
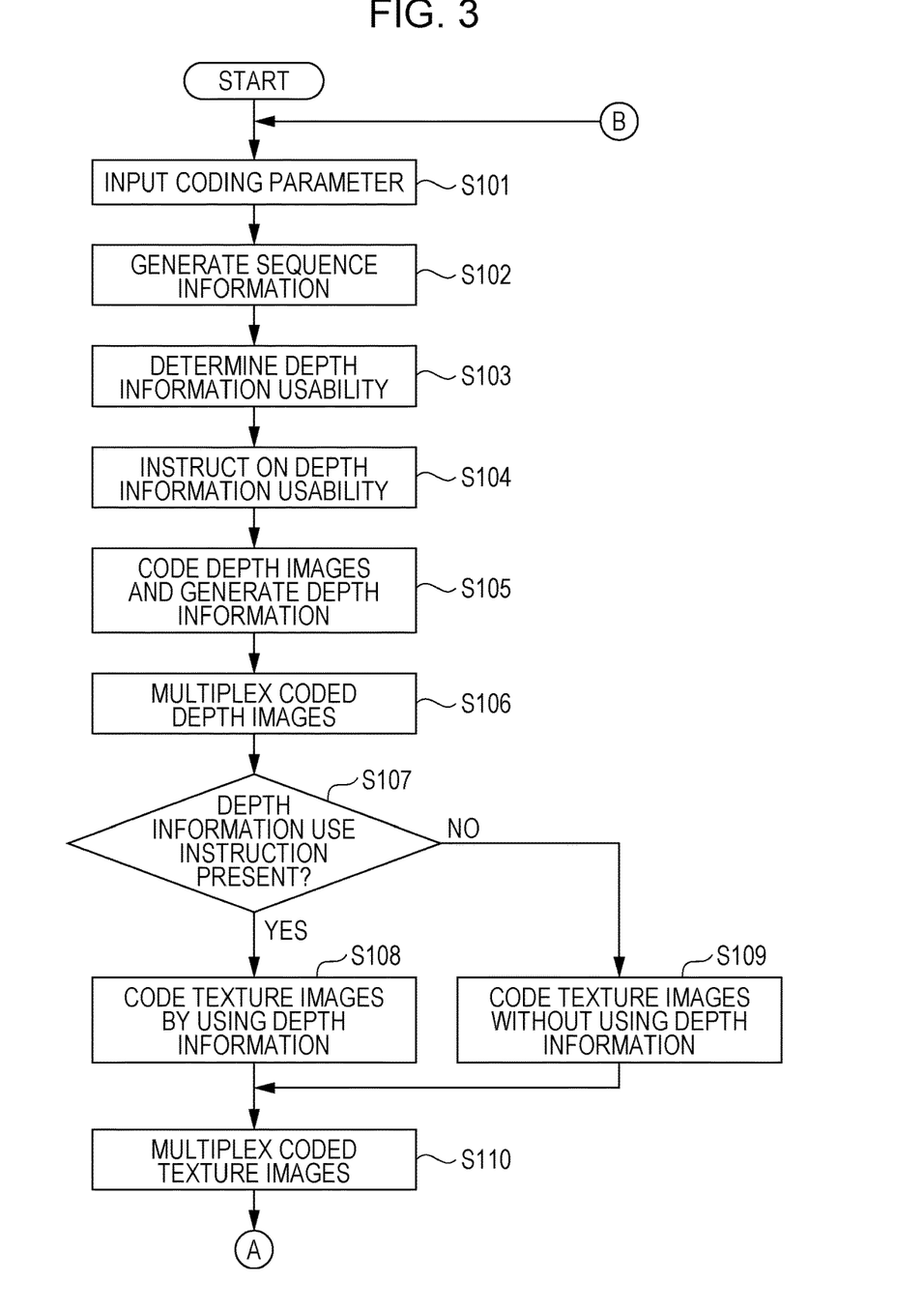
FIG. 3 illustrates an example of a processing procedure that is executed by the image coding device in this embodiment.
Figure 4:
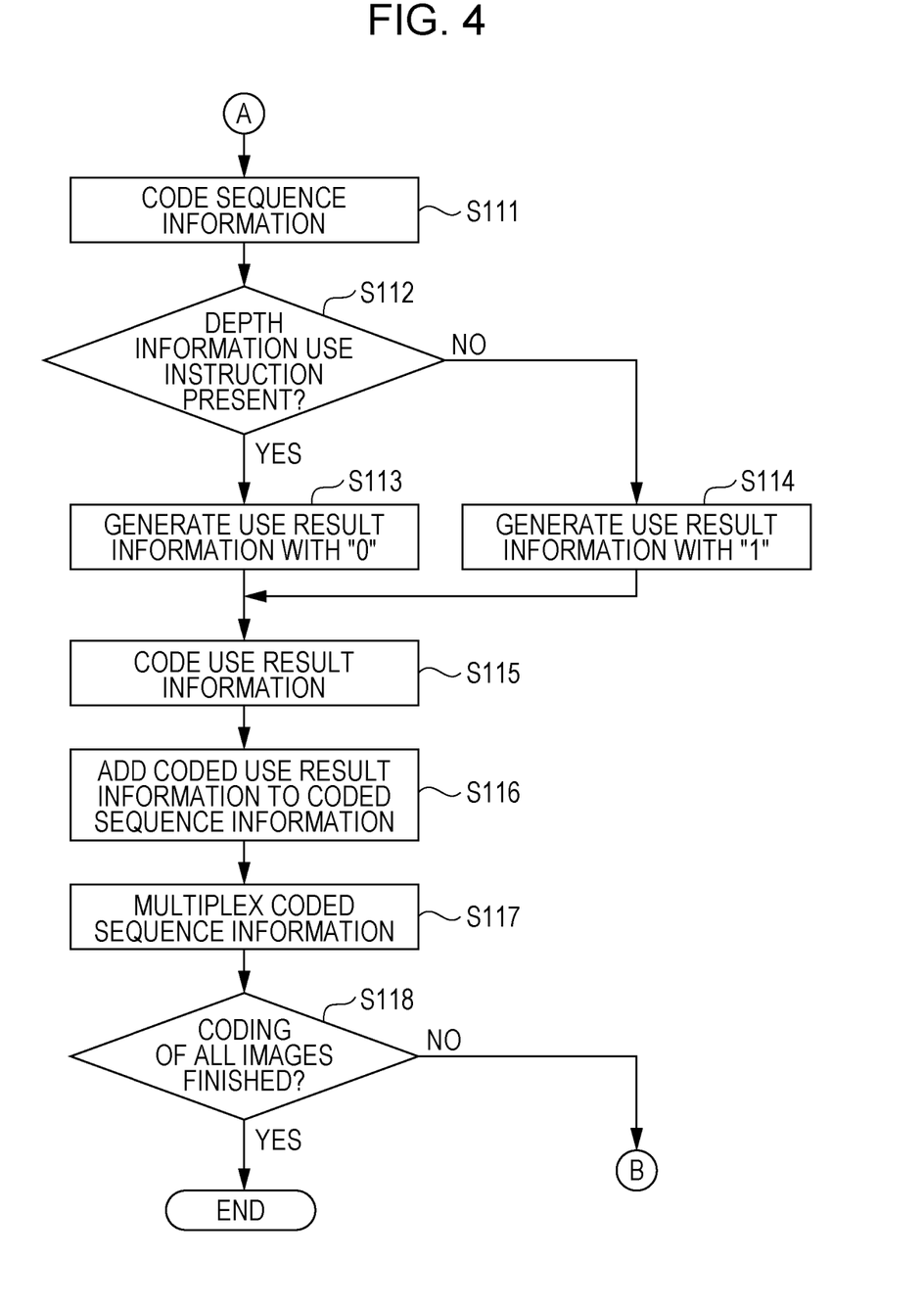
FIG. 4 illustrates an example of a processing procedure that is executed by the image coding device in this embodiment.

Flowcharts in FIGS. 3 and 4 illustrate processing procedures that are executed by the image coding device 300.

In FIG. 3, the coding control parameter pmt is input to the coding management section 311 in the control section 310 (step S101), and the coding management section 311 generates the sequence information Dseq (step S102).

Further, the depth information usability determination section 312 in the control section 310 refers to the depth information use instruction information in the coding control parameter pmt and determines whether or not the depth information Ddp should be used when the texture images Ptx are coded (step S103).

Then, the depth information usability determination section 312 performs instruction for the texture image coding section 320 on whether or not the depth information Ddp should be used when the texture images Ptx are coded in accordance with a determination result in step S103 (step S104). Then, the depth information usability determination section 312 outputs either one of the instruction signal Si for instructing that the depth information Ddp should be used and the instruction signal Si for instructing that the depth information Ddp should not be used to the texture image coding section 320 in accordance with the determination result.

Next, the depth images Pdp are input to the depth image coding section 330, and the depth image coding section 330 generates the coded depth images Pdp_enc by performing the coding process and outputs the coded depth images Pdp_enc to the multiplexing section 350 (step S105). Further, the depth image coding section 330 generates the depth information based on the depth images Pdp that are coding targets and outputs the depth information to the texture image coding section 320 (step S105).

The multiplexing section 350 performs time division multiplexing on the coded depth images Pdp_enc that are generated in step S105 with respect to the bit stream e (step S106).

Next, the texture image coding section 320 determines whether or not the control section 310 provides the instruction that the depth information Ddp should be used when the texture images Ptx are coded (step S107). Thus, for example, the depth information input section 322 in the texture image coding section 320 determines whether or not the instruction signal Si indicates that the depth information Ddp should be used.

If a determination is made that the instruction that the depth information Ddp should be used is performed (step S107: YES), the depth information input section 322 allows the depth information Ddp that is output from the depth image coding section 330 to be input to the texture image coding process section 321. Accordingly, the texture image coding process section 321 codes the texture images Ptx by using the depth information Ddp and generates the coded texture images Ptx_enc (step S108).

On the other hand, if a determination is made that the instruction that the depth information Ddp should be used is not performed (step S107: NO), the depth information Ddp is not input to the texture image coding process section 321. Accordingly, the texture image coding process section 321 codes the texture images Ptx without using the depth information Ddp and generates the coded texture images Ptx_enc (step S109).

The multiplexing section 350 performs the time division multiplexing on the coded texture images Ptx_enc that are generated in step S108 with respect to the bit stream e (step S110).

Further, as illustrated in FIG. 4, the sequence information Dseq that is generated in step S102 is input to the sequence information coding process section 341 in the sequence information coding section 340, and the sequence information coding process section 341 codes the sequence information (step S111).

Further, the use result information coding section 342 in the sequence information coding section 340 determines whether or not the depth information use instruction information that is contained in the input sequence information Dseq indicates that the depth information should be used when the texture images Ptx are coded (step S112).

Here, the use result information is information of one bit, for example. "0" indicates that the texture images are coded by using the depth information, and "1" indicates that the texture images are not coded by using the depth information.

Accordingly, the use result information coding section 342 generates the use result information with a value of "0" (step S113) when the depth information use instruction information indicates that the depth information should be used (step S112: YES).

On the other hand, the use result information coding section 342 generates the use result information with a value of "1" (step S114) when the depth information use instruction information indicates that the depth information should not be used.

In addition, the use result information coding section 342 codes the use result information that is generated and coded in step S113 or S114 to generate the coded use result information (step S115).

The sequence information coding process section 341 adds the coded use result information that is generated in step S115 to the coded sequence information that is generated in step S111 and outputs the coded sequence information Dseq_enc (step S116).

The coded sequence information Dseq_enc that is output in step S116 is input to the multiplexing section 350, and the multiplexing section 350 performs the time division multiplexing on the coded sequence information Dseq_enc with respect to the bit stream e (step S117).

The multiplexing section 350 determines whether or not coding of all the images is finished (step S118) and finishes the process that is illustrated in the drawings in a case where the coding is finished (step S118: YES). On the other hand, the multiplexing section 350 returns to step S101 in a case where the coding is not finished (step S118: NO). Accordingly, the image coding device 300 executes coding of a next image.

Next, the image decoding device 400 will be described.

Figure 5:
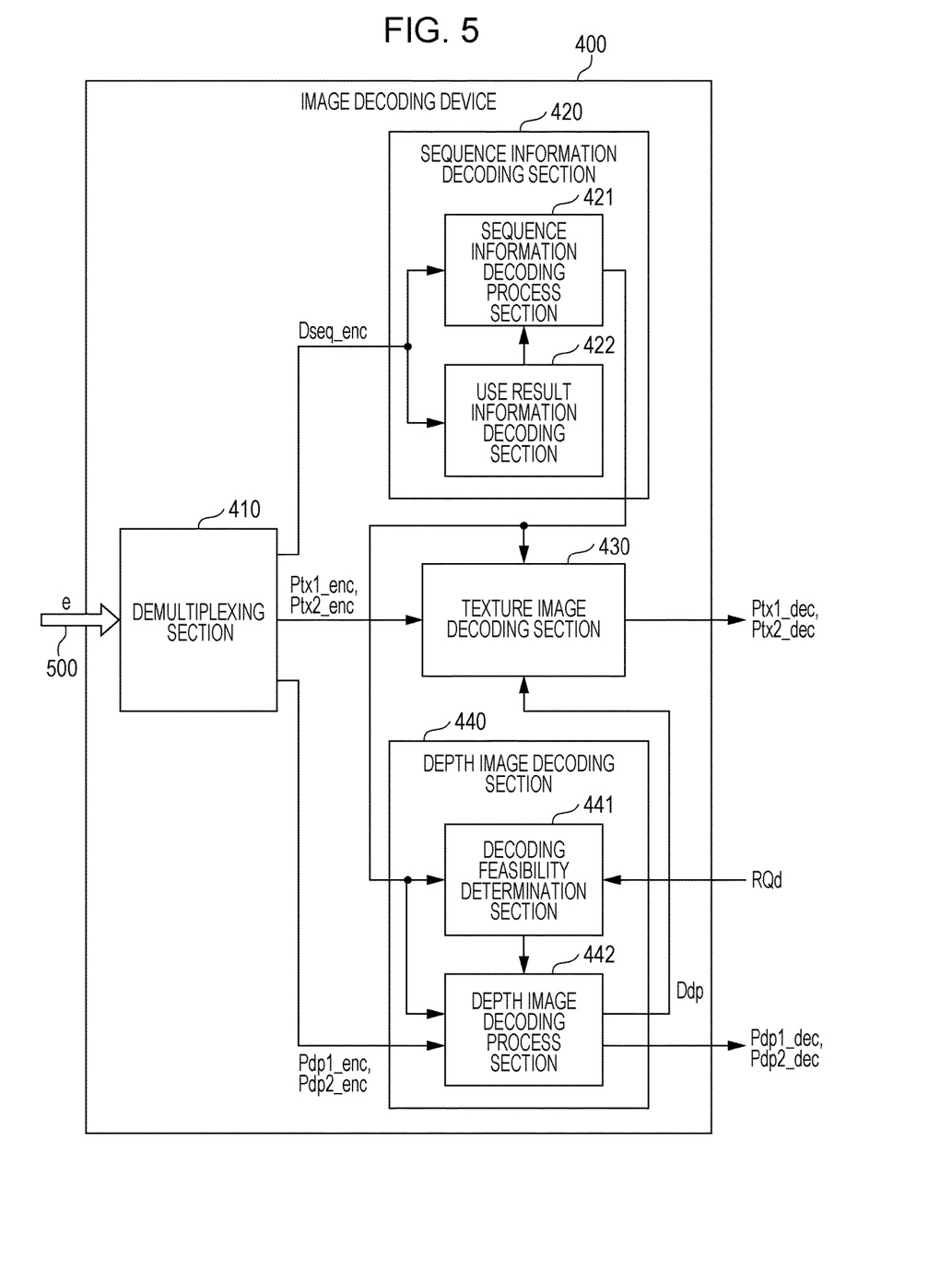
FIG. 5 illustrates a configuration example of an image decoding device in this embodiment.

FIG. 5 illustrates a configuration example of the image decoding device 400. The image decoding device 400 that is illustrated in this drawing includes a demultiplexing section 410, a sequence information decoding section 420, a texture image decoding section 430, and a depth image decoding section 440.

As described above, the coded sequence information Dseq_enc, the coded texture images Ptx1_enc and Ptx2_enc, and the coded depth images Pdp1_enc and Pdp2_enc are multiplexed on the bit stream e.

The demultiplexing section 410 demultiplexes the coded sequence information Dseq_enc, the coded texture images Ptx1_enc and Ptx2_enc, and the coded depth images Pdp1_enc and Pdp2_enc from the input bit stream e.

As described above, the coded sequence information Dseq_enc, the coded texture images Ptx_enc, and the coded depth images Pdp_enc are the NAL units.

In addition, the NAL unit headers of the coded sequence information Dseq_enc, the coded texture images Ptx_enc, and the coded depth images Pdp_enc contain the unit identifiers (nal_unit_type). Further, the unit identifiers respectively indicate which of the sequence information, the texture images, and the depth images the contents of the NAL units are.

Accordingly, the demultiplexing section 410 demultiplexes the NAL units from the bit stream e, extracts the unit identifiers that are contained in the NAL units, and recognizes contents of data that are indicated by the extracted unit identifiers.

When the demultiplexing section 410 recognizes that the unit identifier indicates the sequence information, the demultiplexing section 410 outputs the data of the NAL unit as the coded sequence information Dseq_enc to the sequence information decoding section 420.

Further, when the demultiplexing section 410 recognizes that the unit identifier indicates the texture images, the demultiplexing section 410 outputs the data of the NAL unit that contains the unit identifier as the coded texture images Ptx_enc to the texture image decoding section 430.

Further, when the demultiplexing section 410 recognizes that the unit identifier indicates the depth images, the demultiplexing section 410 outputs the data of the NAL unit that contains the unit identifier as the coded depth images Pdp_enc to the depth image decoding section 440.

The sequence information decoding section 420 decodes the coded sequence information Dseq_enc to generate the sequence information Dseq. Further, the sequence information decoding section 420 also decodes the coded use result information that is added to the coded sequence information Dseq_enc to restore the use result information.

Thus, the sequence information decoding section 420 includes a sequence information decoding process section 421 and a use result information decoding section 422, for example.

The sequence information decoding process section 421 decodes the coded sequence information Dseq_enc to generate the sequence information. Further, the sequence information decoding process section 421 adds the decoded use result information that is input from the use result information decoding section 422 to the generated sequence information. Then, the sequence information decoding process section 421 outputs the sequence information Dseq with the use result information added as described above to the texture image decoding section 430 and the depth image decoding section 440.

The use result information decoding section 422 extracts the coded use result information from the coded sequence information Dseq_enc and decodes the extracted coded use result information to generate the use result information.

The texture image decoding section 430 decodes the coded texture images Ptx1_enc and Ptx2_enc to generate texture images Ptx1_dec and Ptx2_dec. In this decoding, the texture image decoding section 430 uses decoded sequence information Dseq. Further, when the coded texture images Ptx_enc are coded by using the depth information, the same depth information as in the coding is generated by the image decoding section 440. When the depth information is generated as described above, the texture image decoding section 430 decodes the coded texture images Ptx_enc by using the generated depth information.

The depth image decoding section 440 decodes the coded depth images Pdp1_enc and Pdp2_enc to generate depth images Pdp1_dec and Pdp2_dec. Further, the depth image decoding section 440 uses the decoded depth images Pdp_dec to generate the same depth information Ddp as the one used in the coding and outputs the depth information Ddp to the texture image decoding section 430.

Then, in a case where the use result information indicates that the depth information Ddp is used when the coded texture images Ptx_enc are coded, the depth image decoding section 440 executes a decoding process for decoding the coded depth images Pdp_enc. Further, in a case where the use result information indicates that the depth information Ddp is not used when the coded texture images Ptx_enc are coded, the depth image decoding section 440 skips the above decoding process. That is, in this case, the depth image decoding section 440 does not perform the decoding of the coded depth images Pdp_enc.

Thus, the depth image decoding section 440 includes a decoding feasibility determination section 441 and a depth image decoding process section 442.

The sequence information Dseq is input to the decoding feasibility determination section 441, and the decoding feasibility determination section 441 extracts the use result information that is added to the sequence information Dseq. Then, the decoding feasibility determination section 441 recognizes a content (value) of the extracted use result information.

Here, the use result information with a value of "0" indicates that the depth information Ddp is used when the texture images Ptx are coded. In this case, reproduction of the texture images Ptx that are decoded from the coded texture images Ptx_enc needs the depth images Pdp that correspond to the texture images Ptx.

Accordingly, when the decoding feasibility determination section 441 recognizes that the value of the use result information is "0", the decoding feasibility determination section 441 determines that the decoding process should be executed on the coded depth images Pdp_enc.

On the other hand, the use result information with a value of "1" indicates that the depth information Ddp is not used for the coding when the coded texture images Ptx_enc are coded. In this case, reproduction of the texture images Ptx that are decoded from the coded texture images Ptx_enc does not need the depth images Pdp that correspond to the texture images Ptx.

Accordingly, when the decoding feasibility determination section 441 recognizes that the value of the use result information is "1", the decoding feasibility determination section 441 determines that the decoding process should not be executed on the coded depth images Pdp_enc.

Further, the depth image request signal RQd is input to the decoding feasibility determination section 441.

When the depth image request signal RQd indicates a request for the depth images, the decoding feasibility determination section 441 decodes the depth images regardless of whether the value of the use result information is "0" or "1".

On the other hand, when the depth image request signal RQd does not indicate the request for the depth images, the decoding feasibility determination section 441 follows the use result information. That is, the decoding feasibility determination section 441 decodes the depth images in a case where the value of the use result information is recognized as "0" and skips the decoding of the depth images in a case where the value of the use result information is recognized as "1".

In the configuration in FIG. 5, the decoding feasibility determination section 441 extracts the use result information from the sequence information Dseq. However, the decoded use result information may directly be input from the use result information decoding section 422 of the sequence information decoding section 420, for example.

When the decoding feasibility determination section 441 determines that the decoding process should be executed, the depth image decoding process section 442 executes the decoding process of the coded depth images Pdp_enc as a determination target to generate the depth images Pdp_dec.

On the other hand, when the decoding feasibility determination section 441 determines that the decoding process should not be executed, the depth image decoding process section 442 does not execute the decoding process of the coded depth images Pdp_enc as the determination target.

When the coded depth images Pdp_enc are not decoded, the depth information Ddp based on the decoded depth images Pdp_dec is not generated either.

Further, the coded depth images Pdp_enc that are not decoded are not used in subsequent image reproduction. Accordingly, the depth image decoding process section 442 discards the coded depth images Pdp_enc on which the decoding process is not executed, for example.

As described above, the image decoding device 400 of this embodiment decodes only the coded depth images Pdp_enc corresponding to the coded texture images Ptx_enc that are coded by using the depth information Ddp. The image decoding device 400 does not decode the coded depth images Pdp_enc corresponding to the coded texture images Ptx_enc that are coded without using the depth information Ddp.

Thus, in the image decoding device 400 of this embodiment, redundant decoding processes are omitted, and a processing load is largely reduced, thereby improving decoding process efficiency, for example.

Figure 6:
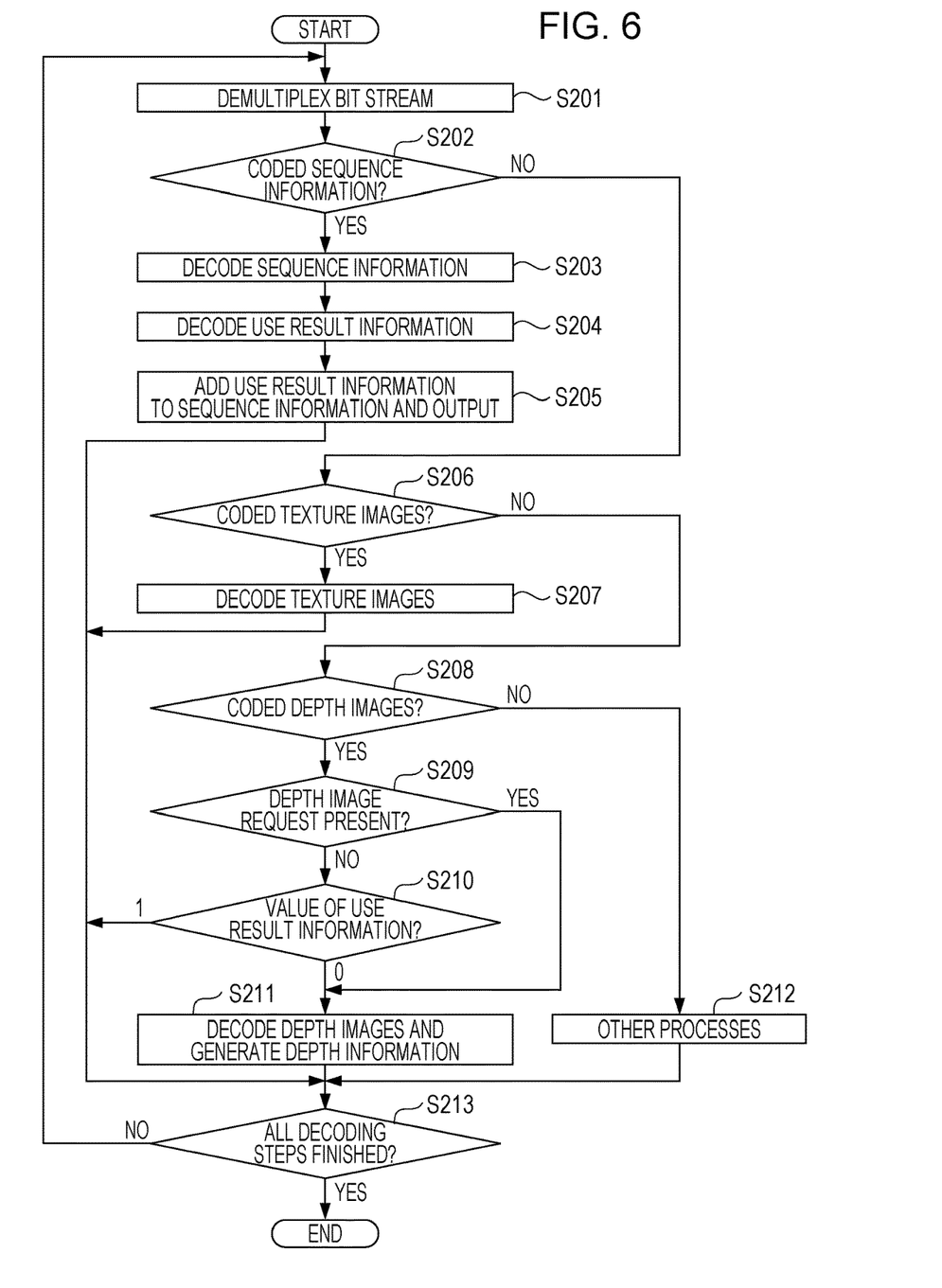
FIG. 6 illustrates an example of a processing procedure that is executed by the image decoding device in this embodiment.

FIG. 6 illustrates a processing procedure that is executed by the image decoding device 400.

The demultiplexing section 410 demultiplexes data that are the NAL unit from the input bit stream e, for example (step S201). Next, the demultiplexing section 410 recognizes the content of the unit identifier that is contained in the demultiplexed NAL unit and thereby determines whether or not data of the demultiplexed NAL unit are the coded sequence information Dseq_enc (step S202).

When the data are the coded sequence information Dseq_enc (step S202: YES), the sequence information decoding process section 421 in the sequence information decoding section 420 decodes the coded sequence information Dseq_enc as the NAL unit (step S203). Further, the use result information decoding section 422 in the sequence information decoding section 420 extracts the coded use result information that is added to the coded sequence information Dseq_enc and decodes the extracted coded use result information (step S204).

Then, the sequence information decoding process section 421 adds the use result information that is decoded in step S204 to the sequence information that is decoded in step S203. Then, the sequence information decoding process section 421 outputs the sequence information Dseq with the added use result information to the texture image decoding section 430 and the depth image decoding section 440 (step S205).

When the data of the demultiplexed NAL unit are not the coded sequence information Dseq_enc (step S202: NO), the demultiplexing section 410 further determines whether or not the data of the demultiplexed NAL unit are the coded texture images Ptx_enc (step S206).

When the data of the demultiplexed NAL unit are the coded texture images Ptx_enc (step S206: YES), the texture image decoding section 430 decodes the demultiplexed coded texture images Ptx_enc to generate the texture images Ptx_dec (step S207).

On the other hand, when the data of the demultiplexed NAL unit are not the coded texture images Ptx_enc (step S206: NO), the demultiplexing section 410 further determines whether or not the data of the demultiplexed NAL unit are the coded depth images Pdp_enc (step S208).

When the data of the demultiplexed NAL unit are the coded depth images Pdp_enc (step S208: YES), the decoding feasibility determination section 441 in the depth image decoding section 440 determines whether or not the depth image request signal RQd indicates a request for the depth images (step S209).

When the depth image request signal RQd indicates the request for the depth images (step S209: YES), the decoding feasibility determination section 441 determines that the coded depth images Pdp_enc should be decoded regardless of the value of the use result information and proceeds to step S211 that will be described below.

On the other hand, when the depth image request signal RQd does not indicate the request for the depth images (step S209: NO), the decoding feasibility determination section 441 further determines whether the value of the use result information that is added to the sequence information Dseq is "0" or "1" (step S210).

As described above, the use result information with a value of "0" indicates that the depth information Ddp is used to code the coded texture images Ptx_enc. When a determination is made that the value of the use result information is "0" (step S210: "0"), this means that the decoding feasibility determination section 441 determines that the coded depth images Pdp_enc should be decoded.

As described above, when a determination is made that the coded depth images Pdp_enc should be decoded, the depth image decoding process section 442 decodes the coded depth images Pdp_enc to generate the depth images Pdp_dec (step S211). In addition, the depth image decoding process section 442 generates the depth information Ddp based on the depth images Pdp_dec (step S211).

Meanwhile, the use result information with a value of "1" indicates that the depth information Ddp is not used to code the coded texture images Ptx_enc. Thus, when a determination is made that the value of the use result information is "1" (step S210: "1"), this means that the decoding feasibility determination section 441 determines that the coded depth images Pdp_enc should not be decoded.

In this case, the depth image decoding process section 442 skips the decoding process of the coded depth images Pdp_enc in step S211 in accordance with the determination result. That is, the decoding process of the coded depth images Pdp_enc is not executed.

When the data of the demultiplexed NAL unit are not the coded depth images Pdp_enc (step S208: NO), the data of the NAL unit are none of the coded sequence information Dseq_enc, the coded texture images Ptx_enc, and the coded depth images Pdp_enc. In this case, prescribed function sections that are not illustrated in FIG. 5 execute prescribed processes that correspond to data kinds of the NAL units (step S212).

After the above processes, the demultiplexing section 410 determines whether or not the decoding of all of the data is finished, for example (step S213). This determination may be made by checking whether or not an end of the bit stream e is detected, for example.

The demultiplexing section 410 returns to step S201 when the decoding of all of the data is not finished (step S213: NO). On the other hand, the process for the decoding that is illustrated in the drawing is finished when the decoding of all of the data is finished (step S213: YES).

The image coding device 300 that is illustrated in FIG. 2 may be realized as an independent device, for example. Further, the image decoding device 400 that is illustrated in FIG. 5 may also be realized as an independent device.

Further, a portion or all of the control section 310, the texture image coding section 320, the depth image coding section 330, the sequence information coding section 340, and the multiplexing section 350 that are function sections that configure the image coding device 300 illustrated in FIG. 2 may be realized as an integrated circuit such as a large scale integration (LSI). Alternatively, a portion or all of the function sections that configure the image coding device 300 may be realized as a chipset that is formed of integrated circuits (IC) or the like.

Similarly, a portion or all of the demultiplexing section 410, the sequence information decoding section 420, the texture image decoding section 430, and the depth image decoding section 440 that are function sections that configure the image decoding device 400 illustrated in FIG. 5 may be realized as an integrated circuit such as the LSI. Alternatively, a portion or all of the function sections that configure the image coding device 300 may be realized as a chipset that is formed of ICs or the like.

In such cases, the function sections that configure the image coding device 300 or the image decoding device 400 may individually be formed as processors or may partially or entirely be integrated to form a processor.

Further, when the image coding device 300 or the image decoding device 400 is formed into an integrated circuit, the image coding device 300 or the image decoding device 400 may be realized as a dedicated circuit or realized by a general-purpose processor, for example.

In the above embodiment, a description is made with an example that is compliant to a coding method of the MPEG-4 AVC/H.264, for example. However, an embodiment is not limited to this. That is, the present invention may be applied to various kinds of coding methods that code and decode kinds of images that correspond to the texture images and the depth images of this embodiment.

Further, a program for realizing functions of the sections in the image coding device 300 in FIG. 2 or the image decoding device 400 in FIG. 5 is recorded in a computer-readable recording medium, the program that is recorded in the recording medium is read and executed by the computer system, and coding and decoding of multiview images may thereby be performed. It should be noted that a "computer system" herein includes an OS and hardware such as peripheral devices.

Further, the "computer system" includes a homepage providing environment (display environment) in a case where the WWW system is used.

Further, "computer-readable recording media" are portable media such as flexible disks, magneto-optical disks, ROMs, and CD-ROMs and storage devices such as hard disks that are built in the computer system. In addition, the "computer-readable recording media" include elements that retain the program for a certain period such as volatile memories (RAMs) in the computer systems that are servers or clients in a case where the program is transmitted via a communication line such as a network like the internet and a telephone line. Further, the program may realize a portion of the above-described functions and may be realized in combination with a program where the above-described functions are already recorded in the computer system.

The embodiment of the present invention has been described with reference to the drawings in the foregoing. However, a specific configuration is not limited to the embodiment, and the present invention includes designs within a scope that does not depart from the gist of the present invention.

DESCRIPTION OF REFERENCE NUMERALS 100 imaging device
200 image front-end processing section
300 image coding device
310 control section
311 coding management section
312 depth information usability determination section
320 texture image coding section
321 texture image coding process section
322 depth information input section
330 depth image coding section
340 sequence information coding section
341 sequence information coding process section
342 use result information coding section
350 multiplexing section
400 image decoding device
410 demultiplexing section
420 sequence information decoding section
421 sequence information decoding process section
422 use result information decoding section
430 texture image decoding section
440 depth image decoding section
441 decoding feasibility determination section
442 depth image decoding process section
500 channel

The invention claimed is:

1. An image coding device which transmits a bit stream containing (i) a texture image and (ii) a depth image, the image coding device comprising:
a depth image coding circuit that codes the depth image;
a texture image coding circuit that codes the texture image; and
a use result information coding circuit that, only in a case where the use result information coding circuit determines that a content of a NAL unit is the texture image, the NAL unit being contained in the bit stream, generates a use result information flag that indicates whether or not a coded depth image is used in coding the texture image and codes the use result information flag thus generated, wherein the use result information coding circuit generates the use result information flag that indicates that a pixel value of the coded depth image is used in coding the texture image in a case where the texture image coding circuit codes the texture image by using the pixel value of the coded depth image.

2. An image decoding device which receives a bit stream containing (i) a texture image and (ii) a depth image, the image decoding device comprising:

a texture image decoding circuit that decodes a coded texture image;

a depth image decoding circuit that decodes a coded depth image; and a use result information decoding circuit that, only in a case where the result information decoding circuit determines that a content of a NAL unit is the texture image, the NAL unit being contained in the bit stream, decodes a coded use result information flag, wherein the texture image decoding circuit determines whether or not a pixel value of a decoded depth image is used in decoding the coded texture image by using a decoded use result information flag, and decodes the coded texture image by using the pixel value of the decoded depth image in a case where the decoded use result information flag indicates that the pixel value of the decoded depth image is used in decoding the coded texture image.

3. An image decoding method for receiving a bit stream containing (i) a texture image and (ii) a depth image, the method comprising:

decoding a coded depth image;

decoding a coded use result information flag only in a case where it is determined that a content of a NAL unit is the texture image, the NAL unit being contained in the bit stream;

determining whether or not a pixel value of a decoded depth image is used in decoding a coded texture image by using a decoded use result information flag; and decoding the coded texture image by using the pixel value of the decoded depth image in a case where the decoded use result information flag indicates that the pixel value of the decoded depth image is used in the decoding the coded texture image.

4. An image coding method for transmitting a bit stream containing (i) a texture image and (ii) a depth image, the method comprising:

coding the depth image;

coding the texture image by using a pixel value of a coded depth image; and generating, only in a case where it is determined that a content of a NAL unit is the texture image, the NAL unit being contained in the bit stream, a use result information flag that indicates that the pixel value of the coded depth image is used in the coding the texture image.

* * * * *